United States Patent [19]

Nagoya et al.

[11] 3,725,437
[45] Apr. 3, 1973

[54] PROCESS FOR THE PREPARATION OF α-HYDROXY-βPHENYPROPIONIC ACID DERIVATIVES AND ALKALIMETAL-OR AMMONIUM SALTS THEREOF

[75] Inventors: Tsutomu Nagoya, Ashigarashimo-gun; Yoshito Fujima, Kamakura; Yoichi Shimizu, Yokohama, all of Japan

[73] Assignee: Sankyo Chemical Industries Limited

[22] Filed: Sept. 16, 1970

[21] Appl. No.: 72,903

[52] U.S. Cl. ............... 260/340.5, 195/104, 260/141, 260/348, 260/521 R, 424/282
[51] Int. Cl. ............................................. C07d 13/10
[58] Field of Search ............ 260/340.5, 521 B, 473 A

[56] References Cited

UNITED STATES PATENTS 3,259,649   7/1966   McClure ........................ 260/473 A

OTHER PUBLICATIONS

Hueter, "Chemical Abstracts," Vol. 57 (1962), Col. 12326d.

*Primary Examiner*—Donald G. Daus
*Assistant Examiner*—James H. Turnipseed
*Attorney*—Mc Glew and Toren

[57] ABSTRACT

α-Hydroxy-β-phenylpropionic acid derivatives having the formula

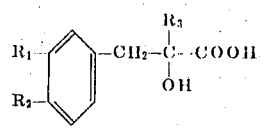

wherein $R_1$ and $R_2$ represent a hydroxy group or a methoxy group or $R_1$ and $R_2$ taken together represent a methylenedioxy group and $R_3$ represents a hydrogen atom or a methyl group and alkali metal- or ammonium salts thereof which are useful as intermediates for the synthesis of L-α-methyl-β-(3,4-dihydroxyphenyl)-alanine and L-β-(3,4-dihydroxyphenyl)alanine. The propionic acid derivatives and the salts thereof are prepared by subjecting a β-phenylglycidic acid derivative having the formula

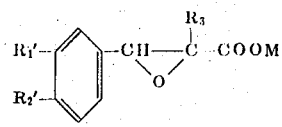

wherein $R_1'$ and $R_2'$ are a benzyloxy group or the same as $R_1$ and $R_2$ provided that when $R_1$ and $R_2$ are a hydroxy group, $R_1'$ and $R_2'$ represent a benzyloxy group, $R_3$ is the same as above and M represents an alkali metal or ammonium to a catalytic reduction in the presence of an organic polar solvent such as methanol and acetone.

3 Claims, No Drawings

PROCESS FOR THE PREPARATION OF α-HYDROXY-β-PHENYPROPIONIC ACID DERIVATIVES AND ALKALIMETAL-OR AMMONIUM SALTS THEREOF

This invention relates to an improved process for the preparation of α-hydroxy-β-phenylpropionic acid derivatives having the formula

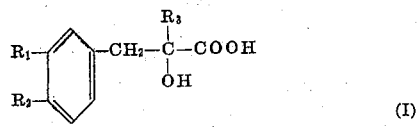

(I)

wherein $R_1$ and $R_2$ represent a methoxy group or $R_1$ and $R_2$ taken together represent a methylenedioxy group and $R_3$ represents a hydrogen atom or a methyl group and alkali metal- or ammonium salts thereof. The α-hydroxy-β-phenylpropionic acid derivatives and the salts thereof obtained by the present invention are known compounds and useful as intermediates for the synthesis of L-α-methyl-β-(3,4-dihydroxyphenyl)alanine and L-β-(3,4-dihydroxyphenyl) alanine which are which are known as an antihypertensive agent or an antiparkinsonian drug. For instance, L-β-(3,4-dihydroxyphenyl)alanine is prepared by aminating the β-phenylpropionic acid derivative by the action of *Brevibacterium ammoniagenes* to give only the L-isomer of the α-amino-β-phenylpropionic acid derivative and, if necessary, hydrolyzing the latter compound with hydrobromic acid. And, L-α-methyl-β-(3,4-dihydroxyphenyl)alanine is prepared by halogenating the L-α-methyl-β-phenylpropionic acid derivative with thionyl halide, for example, thionyl chloride to give L-α-halogeno-α-methyl-β-phenylpropionic acid derivative, aminating the latter compound with ammonia to give the L-α-methyl-β-phenylalanine derivative and, if necessary, hydrolyzing the latter compound.

Heretofore a process for the preparation of the propionic acid derivative (I) has been provided by Gottfried Faust et al., in East German Pat. No. 53,701. According to the prior process, they may be prepared by diazotizing 4-aminoveratrol with sodium nitrite, subjecting the diazonium compound to a coupling reaction with acrylonitrile or methacrylonitrile and hydrolyzing the coupling product with sulfuric acid. However, the prior process is commercially disadvantageous, because the yield in the coupling reaction is extremely low. Accordingly, it would be strongly desired in the art to find out the more advantageous method for the production of the propionic acid derivatives. It is an object of this invention to provide an improved process by which the propionic acid derivatives are prepared with a high yield.

According to the present invention, the propionic acid derivatives (I) are prepared by subjecting a β-phenylglycidic acid derivative having the formula

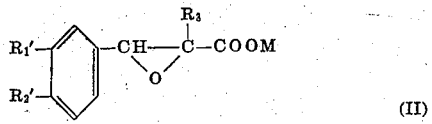

(II)

wherein $R_1'$ and $R_2'$ are a benzyloxy group or the same as $R_1$ and $R_2$ provided that when $R_1$ and $R_2$ are a hydroxy group, $R_1'$ and $R_2'$ are a benzyloxy group, $R_3$ is the same as above and M represents an alkali metal or ammonium to a catalytic reduction in the presence of an organic polar solvent.

In carrying out the present invention, the β-phenylglycidic acid derivatives (II) and a catalyst are advantageously suspended in the organic polar solvent and the suspension is contacted with hydrogen gas by a conventional means, for example, stirring or bubbling at an ordinary temperature and pressure. As the catalyst, there may be employed any catalyst that would be employed in a usual catalytic reduction. Preferably there may be employed palladium on carbon and a Raney nickel catalyst. The β-phenylglycidic acid derivatives (II) are sparingly soluble in an organic solvent. In the present invention, there may be preferably employed such a polar organic solvent that would dissolve a large amount of the derivatives (II) as far as possible. When a polar organic solvent scarcely dissolves the derivatives (II), the solvent containing a suitable amount of water is preferably employed. But the water content is preferably low as far as possible, because the derivatives (II) are decomposed to phenylacetoaldehyde derivatives by the presence of water. Representative examples of the solvent employed in this invention are methanol, ethanol, acetone, methyl ethyl ketone and dioxane. Most preferably there may be employed methanol. The reaction temperature and pressure are not critical and the reaction is preferably carried out at an ordinary temperature and pressure.

However, when the aqueous solvent is employed, it is preferable to carry out the reaction at a lower temperature. After completion of the reaction, the desired product is recovered by a conventional means. For instance, the reaction mixture is filtered to remove the catalyst and the filtrate is concentrated to dryness. The residue is washed with a suitable solvent such as ethanol to give crystals of the desired product as an alkali metal or ammonium salt. When the free acid (I) is desired, a small amount of water is added to the residue obtained as above and a mineral acid such as sulfuric acid and hydrochloric acid is added to the aqueous solution to give the desired product as crystals.

The benzyloxy group of the β-phenylglycidic acid derivative (II) is converted to a hydroxy group by the catalytic reduction during the reaction in this invention.

According to the present invention, the desired products (I) may be easily prepared from the β-phenylglycidic acid derivatives with such a high yield as above 90 percent. Furthermore, the β-phenylglycidic acid derivatives (II) employed as a starting material in this invention can be commercially prepared by reacting benzaldehyde derivatives such as piperonal and veratraldehyde with esters of α-chloropropionic acid or chloroacetic acid to give esters of β-phenylglycidic acid derivatives and hydrolyzing the latter compounds. Therefore, the process of the present invention is commercially advantageous.

Representative examples of the desired products in this invention are as follows;

α-hydroxy-β-(3,4-dimethoxyphenyl)propionic acid,
α-hydroxy-α-methyl-β-(3,4-dimethoxyphenyl)propionic acid,
α-hydroxy-β-(3,4-methylenedioxyphenyl)propionic acid, α-hydroxy-α-methyl-β-(3,4-methylenedioxyphen-
yl)propionic acid,
α-hydroxy-β-(3,4-dihydroxyphenyl)propionic acid
and
α-hydroxy-α-methyl-β-(3,4-dihydroxyphen-
yl)propionic acid.

The following examples are given to illustrate the present invention.

Example 1.

7.38 g. of sodium β-(3,4-dimethoxyphenyl)glycidate are suspended in 100 ml. of 98 percent methanol. To the suspension is added 0.7 g. of 5 percent palladium on carbon. The resulting mixture is contacted with hydrogen gas at 25°C under atmospheric pressure with stirring. After 30 minutes the absorption of hydrogen gas ceases and the reaction is over. The catalyst is filtered off from the reaction mixture and the filtrate is concentrated to dryness. To the residue is added a small amount of water and the aqueous solution is made acidic by addition of hydrochloric acid to give 6.20 g. (91.5 percent yield) of α-hydroxy-β-(3,4-dimethoxyphenyl)propionic acid as crystals melting at 123°–124°C.

Example 2.

5.75 g. of sodium β-(3,4-methylenedioxyphen-yl)glycidate are suspended in 80 ml. of 99 percent methanol and 0.5 g. of a Raney nickel catalyst is added to the suspension. The resulting mixture is contacted with hydrogen gas at 25°C under atmospheric pressure with stirring. After completion of the reaction, the reaction mixture is treated with the same procedure as in Example 1 to give 4.88 g. (93 percent yield) of α-hydroxy-β-(3,4-methylenedioxyphenyl)propionic acid melting at 95°–96°C.

Example 3.

5.20 g. of sodium α-methyl-β-(3,4-dimethoxyphen-yl)-glycidate are suspended in 50 ml. of 95 percent methanol and 0.5 g. of 5 percent palladium on carbon is added to the suspension. The resulting mixture is contacted with hydrogen gas at 25°C under atmospheric pressure with stirring. After completion of the reaction, the reaction mixture is treated with the same procedure as in Example 1 to give 4.37 g. (91 % yield) of α-hydroxy-α-methyl-β-(3,4-dimethoxyphen-yl)propionic acid melting at 120°–121°C.

Example 4.

22.1 g. of sodium β-(3,4-dibenzyloxyphen-yl)glycidate are suspended in 203 ml. of 99 percent methanol. To the suspension are added 2.2 g. of 5 percent palladium on carbon. The resulting mixture is contacted with hydrogen gas at 25°C under atmospheric pressure with stirring. After 30 minutes the absorption of hydrogen gas ceases and the reaction is over.

The catalyst is filtered off from the reaction mixture and the filtrate is concentrated to dryness. To the residue are added 47 ml. of 95 percent ethanol to give 10 g. (82.0 percent yield) of sodium α-hydroxy-β-(3,4-dihydroxyphenyl)propionate as crystals melting at 226°–227°C. The product thus obtained is treated with hydrochloric acid to give α-hydroxy-β-(3,4-dihydrox-yphenyl)propionic acid melting at 142°C.

What is claimed is:

1. A process for the preparation of a α-hydroxy-β-phenylpropionic acid derivative having the formula

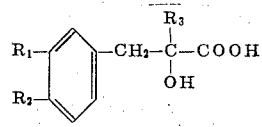

wherein $R_1$ and $R_2$ represent a hydroxy group or a methoxy group or $R_1$ and $R_2$ taken together represent a methylenedioxy group and $R_3$ represents a hydrogen atom or a methyl group or an alkali metal— or ammonium salt thereof which comprises subjecting a β-phenylglycidic acid derivative having the formula

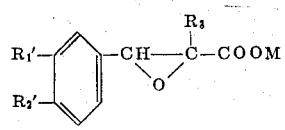

wherein $R_1'$ and $R_2'$ are a benzyloxy group or the same as $R_1$ and $R_2$ provided that when $R_1$ and $R_2$ are a hydroxy group, $R_1'$ and $R_2'$ are a benzyloxy group, $R_3$ is the same as above and M represents an alkali metal or ammonium to a catalytic reduction in the presence of an organic polar solvent and hydrogen gas, the catalyst for the catalytic reduction being palladium on carbon or a Raney nickel catalyst.

2. A process as claimed in claim 1 wherein said organic polar solvent is methanol.

3. A process as claimed in claim 1 wherein the catalytic reduction is carried out at an ordinary temperature and pressure.

* * * * *

UNITED STATES PATENT OFFICE
CERTIFICATE OF CORRECTION

Patent No. 3,725,437          Dated April 3, 1973

Inventor(s) Tsutomu Nagoya et al

It is certified that error appears in the above-identified patent and that said Letters Patent are hereby corrected as shown below:

In the heading of the patent, insert:

--[30]   Foreign Application Priority Data

September 25, 1969   Japan.........76463/69--

Signed and sealed this 19th day of March 1974.

(SEAL)
Attest:

EDWARD M. FLETCHER, JR.          C. MARSHALL DANN
Attesting Officer                Commissioner of Patents